(12) United States Patent
Chung et al.

(10) Patent No.: US 8,102,120 B2
(45) Date of Patent: Jan. 24, 2012

(54) PLASMA DISPLAY PANEL

(75) Inventors: Kyeongwoon Chung, Suwon-si (KR);
Young Kwan Kim, Suwon-si (KR);
Jung-Woo Moon, Suwon-si (KR);
Soon-Rewl Lee, Suwon-si (KR);
Young-Gil Yoo, Suwon-si (KR);
Minkyu Kim, Suwon-si (KR);
Jeong-Hyeon Ha, Suwon-si (KR);
Jeong-Hee Kim, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 53 days.

(21) Appl. No.: 12/654,158

(22) Filed: Dec. 11, 2009

(65) Prior Publication Data

US 2010/0148660 A1    Jun. 17, 2010

(30) Foreign Application Priority Data

Dec. 12, 2008   (KR) ................ 10-2008-0126773

(51) Int. Cl.
*H01J 1/62* (2006.01)
(52) U.S. Cl. ......... 313/587; 313/584; 313/585; 313/586
(58) Field of Classification Search ........... 313/582–587
See application file for complete search history.

(56) References Cited

U.S. PATENT DOCUMENTS

| 5,541,618 A | 7/1996 | Shinoda |
| 5,661,500 A | 8/1997 | Shinoda et al. |
| 5,663,741 A | 9/1997 | Kanazawa |
| 5,674,553 A | 10/1997 | Shinoda et al. |
| 5,724,054 A | 3/1998 | Shinoda |
| 5,786,794 A | 7/1998 | Kishi et al. |
| 5,952,782 A | 9/1999 | Nanto |
| RE37,444 E | 11/2001 | Kanazawa |

(Continued)

FOREIGN PATENT DOCUMENTS

| JP | 2845183 | 10/1998 |
| JP | 11-043670 | 2/1999 |
| JP | 2917279 | 4/1999 |
| JP | 2001-043804 | 2/2001 |
| JP | 2001-325888 | 11/2001 |

(Continued)

OTHER PUBLICATIONS

"*Final Draft International Standard*", Project No. 47C/61988-1/Ed. 1; Plasma Display Panels—Part 1: Terminology and letter symbols, published by International Electrotechnical Commission, IEC. in 2003, and Appendix A—Description of Technology, Annex B—Relationship Between Voltage Terms and Discharge Characteristics; Annex C—Gaps and Annex D—Manufacturing.

*Primary Examiner* — Bumsuk Won
(74) *Attorney, Agent, or Firm* — Robert E. Bushnell, Esq.

(57) ABSTRACT

A plasma display panel that includes a first substrate and a second substrate facing each other, a plurality of address electrodes disposed on the first substrate, a plurality of display electrodes disposed on one side of the second substrate facing the first substrate in a direction crossing the address electrodes, and red, green, and blue phosphor layers disposed in a discharge space between the first and second substrates. The green phosphor layer includes a green phosphor and an inorganic pigment absorbing a wavelength of about 580 nm to about 640 nm. The plasma display panel includes a green phosphor layer having a reduced decay time and good color purity characteristics, as well as excellent luminance, discharge, and life-span characteristics.

22 Claims, 3 Drawing Sheets

U.S. PATENT DOCUMENTS

| | | |
|---|---|---|
| 6,630,916 B1 | 10/2003 | Shinoda |
| 6,707,436 B2 | 3/2004 | Setoguchi et al. |
| 7,141,921 B2 | 11/2006 | Choi |
| 2007/0007494 A1 | 1/2007 | Hirosaki et al. |
| 2008/0074052 A1* | 3/2008 | Lee et al. ............ 313/586 |
| 2008/0100219 A1* | 5/2008 | Kim et al. ............ 313/586 |
| 2008/0224593 A1 | 9/2008 | Yoo |
| 2008/0297049 A1* | 12/2008 | Han et al. ............ 313/582 |
| 2009/0026909 A1 | 1/2009 | Cha et al. |
| 2009/0058298 A1 | 3/2009 | Hong et al. |

FOREIGN PATENT DOCUMENTS

| | | |
|---|---|---|
| JP | 2006-228645 | 8/2006 |
| KR | 10-2006-0082760 | 7/2006 |
| KR | 10-2007-0078218 | 7/2007 |
| KR | 10-2007-0093629 | 9/2007 |
| KR | 10-2007-0094133 | 9/2007 |
| KR | 10-2007-0097214 | 10/2007 |
| KR | 10-0787459 | 12/2007 |

* cited by examiner

PLASMA DISPLAY PANEL

CLAIM OF PRIORITY

This application makes reference to, incorporates the same herein, and claims all benefits accruing under 35 U.S.C. §119 from an application earlier filed in the Korean Intellectual Property Office on Dec. 12, 2008 and there duly assigned Serial No. 10-2008-0126773.

BACKGROUND OF THE INVENTION

1. Field of the Invention

An aspect of the present invention relates to a plasma display panel.

2. Description of the Related Art

A plasma display panel (hereinafter referred to as a "PDP") is a display apparatus using plasma discharge. The plasma discharge emits vacuum ultraviolet (hereinafter referred to as "VUV") rays, which excite a phosphor layer, and in turn the phosphor layer emits visible light. The visible light is used to display an image.

The above information disclosed in this Related Art section is only for enhancement of understanding of the background of the invention and therefore it may contain information that does not form the prior art that is already known to a person of ordinary skill in the art.

SUMMARY OF THE INVENTION

An exemplary embodiment of the present invention provides a plasma display panel (PDP) including a green phosphor layer with excellent luminance, discharge, and life-span characteristics, as well as a reduced decay time and good color purity characteristics.

The embodiments of the present invention are not limited to the above technical purposes, and a person of ordinary skill in the art can understand other technical purposes.

According to one embodiment of the present invention, provided is a PDP that includes a first substrate and a second substrate facing each other, a plurality of address electrodes disposed on the first substrate, a plurality of display electrodes disposed on one side of the second substrate facing the first substrate in a direction crossing the address electrodes, and red, green, and blue phosphor layers disposed in a discharge space between the first substrate and the second substrate. The green phosphor layer includes a green phosphor and an inorganic pigment absorbing a wavelength ranging from about 580 nm to about 640 nm.

The inorganic pigment may be cyanide-based, silicate-based, or oxysulfide-based, as long as it absorbs a wavelength ranging from about 580 nm to about 640 nm region. The inorganic pigment is selected from the group consisting of: blue $(Fe[Fe(III)Fe(II)(CN)_6]_3$, $Fe_4[Fe(CN)_6]_3 \cdot nH_2O$ (where n is an integer of 1 or more)); ultramarine blue $(Na_pAl_6Si_6O_{24}S_q$ (where p is an integer ranging from 6 to 10, and q is an integer ranging from 2 to 4)), $Fe(NH_4)Fe(CN)_6 \cdot xH_2O$ (where x is an integer of 1 or more); phthalocyanine blue; cobalt blue $(CoO.Al_2O_3)$; vanadium blue; $2(Co,Zn)O.SiO_2$; $ZrSiO_4$; cerulean blue $(CoO.nSiO_2.MgO$ (where n is an integer of 1 or more)); Prussian blue $(KFe[Fe(CN)_6])$; $(Co(SCN)_4)^{-2}$; and a combination thereof.

The green phosphor may be selected from the group consisting of $YAl_3(BO_3)_4:Tb$, $YBO_3:Tb$, $(Ba, Sr, Mg)O.aAl_2O_3:Mn$ (where a ranges from 1 to 23), $Y_2SiO_5:Tb$, $Gd_2O_2S:Tb$, $ZnS:(Cu, Al)$, $ZnSiO_4:Mn$, $Zn(Ga, Al)_2O_4:Mn$, $GdAl_3(BO_3)_4:Tb$, $(Y,Gd)BO_3:Tb$, $GdBO_3:Tb$, and a combination thereof. In particular, it may be selected from the group consisting of $YAl_3(BO)_4:Tb$, $YBO_3:Tb$, and a combination thereof.

The green phosphor and the inorganic pigment have a particle diameter ratio ranging from 1:about 0.1 to about 0.8.

The inorganic pigment is mixed with the green phosphor or coated on the surface thereof.

The green phosphor has a particle diameter ranging from about 2 μm to about 5 μm, while the inorganic pigment has a particle diameter ranging from about 0.002 μm to about 1.5 μm.

Accordingly, the plasma display panel (PDP) includes a green phosphor layer having reduced decay time and good color purity characteristics, and has excellent luminance, discharge, and life-span characteristics.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

DETAILED DESCRIPTION OF THE EMBODIMENTS

Figure 1:
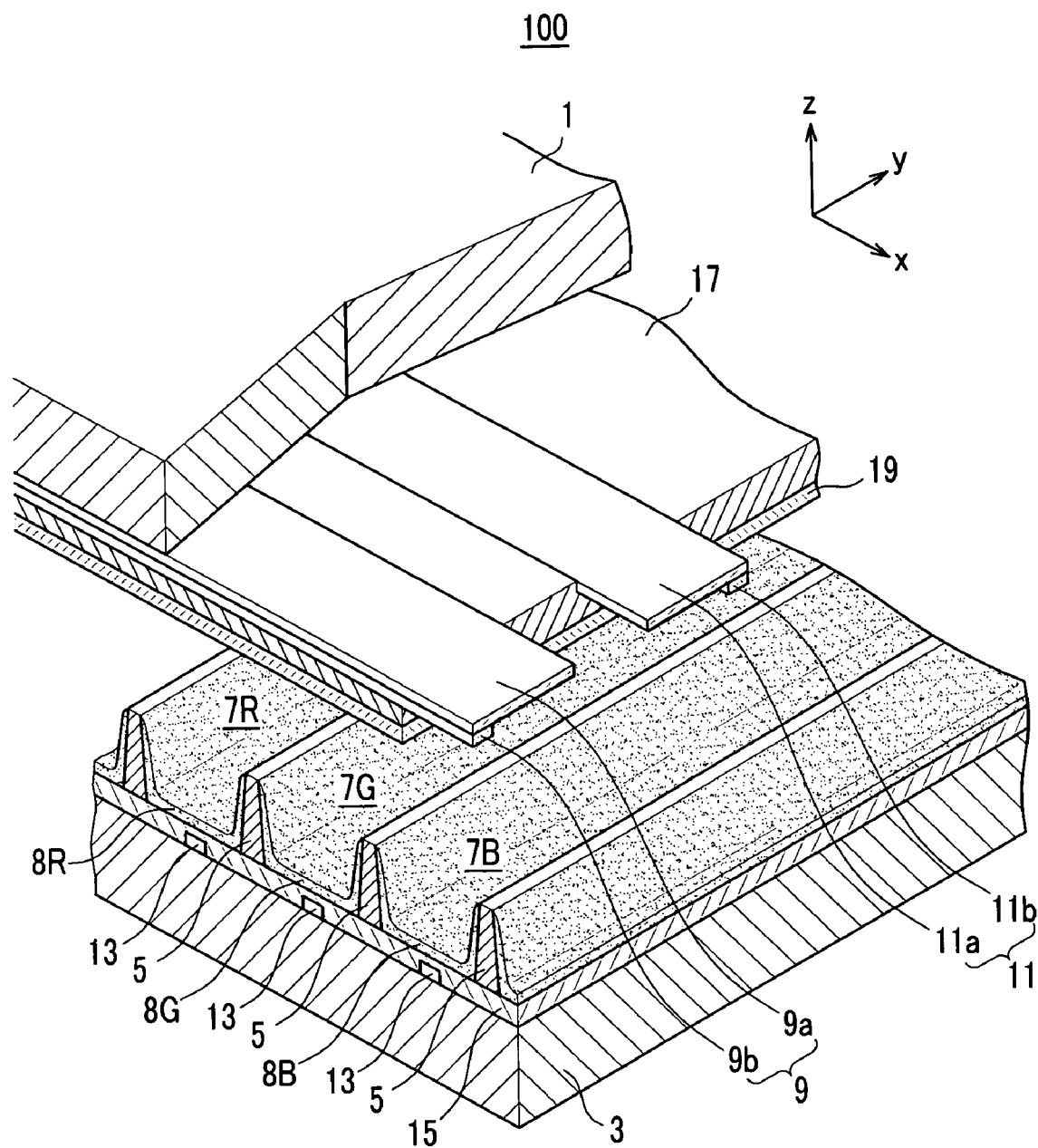
FIG. 1 is a partially-exploded perspective view showing a PDP according to one embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

Here, when one element is referred to as being connected to another element, one element may be not only directly connected to the another element but instead may be indirectly connected to the another element via one or more other elements. Also, when an element is referred to as being "on" another element, it can be directly on the another element or be indirectly on the another element with one or more intervening elements interposed therebetween. Further, some of the elements that are not essential to the complete description of the invention have been omitted for clarity. In addition, like reference numerals refer to like elements throughout.

In the drawings, the thickness of layers, films, panels, regions, etc., are exaggerated for clarity. Like reference numerals designate like elements throughout the specification.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

A PDP has a structure as follows. On a rear substrate, address electrodes are disposed in one direction, and a dielectric layer is disposed on the address electrodes. Barrier ribs are formed on the dielectric layer in a stripe pattern. Red (R), green (G), and blue (B) phosphor layers are positioned on the discharge cells between the barrier ribs.

On one surface of a front substrate facing the rear substrate, display electrodes are formed in a crossing direction with respect to the address electrodes, wherein each display electrode is composed of a pair of a transparent electrode and a bus electrode. A dielectric layer and a protection layer are formed on the front substrate, covering the display electrodes. A discharge cell is formed on the cross-section of the address electrodes of the rear substrate and the display electrodes of the front substrate.

In the PDP, address discharge is performed by applying an address voltage (Va) to a space between the address electrodes and the display electrodes. When a sustain voltage (Vs) is applied to a space between a pair of display electrodes, an excitation source generated from the sustain discharge excites corresponding phosphors to thereby emit visible light through the front substrate and display an image. The phosphors are usually excited by vacuum ultraviolet (VUV) rays.

The phosphor layer is formed by using red, green, and blue phosphors. Each Phosphor emits visible light due to synchrotron radiation of Xe ions (147 nm VUV rays).

In general, a phosphor for a plasma display should have excellent light emitting luminance, luminous efficiency, and color purity, and also a short decay time. In particular, it should not be deteriorated by heat or ultraviolet (UV) rays.

A conventional plasma display panel (PDP) may include $ZnSi_2O_4$:Mn as a green phosphor or a mixture phosphor of $YBO_3$:Tb and (Ba, Sr, Mg)O.a$Al_2O_3$:Mn (where a ranges from 1 to 23). However, the $ZnSi_2O_4$:Mn phosphor has excellent luminance but a problem of deteriorating life-span, and particularly an increasing discharge voltage, since it has a negative surface charge. In addition, the $YBO_3$:Tb phosphor has excellent luminance, life-span, and discharge voltage characteristics but has a problem of deteriorating color purity. The (Ba, Sr, Mg)O.a$Al_2O_3$:Mn (where a ranges from 1 to 23) phosphor has the best color purity and excellent discharge voltage characteristics, but has a problem of life-span deterioration and a long decay time.

In addition, another $YAl_3$ $(BO)_4$:Tb green phosphor for a plasma display panel (PDP) has excellent luminance, discharge, and life-span characteristics, and a short decay time of about 6 ms. However, when the conventional green phosphors are applied to a plasma display panel (PDP), they have minor peaks at about 480 nm, about 590 nm, or about 620 nm in addition to a major peak at about 540 nm. In particular, the green phosphors with minor peaks may have a negative influence on the color purity. The green phosphors with minor peaks representatively include $YAl_3(BO)_4$:Tb, $YBO_3$:Tb, $GdAl_3(BO_3)_4$:Tb, (Y,Gd)$BO_3$:Tb, $GdBO_3$:Tb, and the like.

According to one embodiment of the present invention, a PDP includes a first substrate and a second substrate facing each other, a plurality of address electrodes disposed on the first substrate, a plurality of display electrodes disposed on one side of the second substrate facing the first substrate in a direction crossing the address electrodes, and red, green, and blue phosphor layers disposed in a discharge space between the first substrate and the second substrate. The green phosphor layer includes a green phosphor and an inorganic pigment absorbing a wavelength ranging from about 580 nm to about 640 nm.

In particular, the inorganic pigment absorbs a wavelength ranging from about 585 nm to about 595 nm and about 615 nm to about 625 nm. Since it absorbs a wavelength ranging from about 580 nm to about 640 nm, it can improve color purity of a green phosphor when the green phosphor emits visible light due to vacuum ultraviolet (VUV) rays. In addition, when the green phosphor emits light, it is beneficial to absorb a wavelength ranging from about 585 nm to about 595 nm and about 615 nm to about 625 nm that deteriorates color purity of the green phosphor.

The inorganic pigment may include any cyanide-based, silicate-based, or oxysulfide-based pigment, as long as it absorbs a wavelength ranging from about 580 nm to about 640 nm. Examples of the inorganic pigment may be selected from the group consisting of: blue (Fe[Fe(III)Fe(II)(CN)$_6$]$_3$, Fe$_4$[Fe(CN)$_6$]$_3$.nH$_2$O (where n is an integer of 1 or more)); ultramarine blue (Na$_p$Al$_6$Si$_6$O$_{24}$S$_q$ (where p is an integer ranging from 6 to 10, and q is an integer ranging from 2 to 4)), Fe(NH$_4$)Fe(CN)$_6$.xH$_2$O (where x is an integer of 1 or more); phthalocyanine blue; cobalt blue (CoO.Al$_2$O$_3$); vanadium blue; 2(Co,Zn)O.SiO$_2$; ZrSiO$_4$; cerulean blue (CoO.nSiO$_2$.MgO (where n is an integer of 1 or more)); Prussian blue (KFe[Fe (CN)$_6$]); (Co(SCN)$_4$)$^{-2}$; and a combination thereof. In particular, it may be selected from the group consisting of: blue (Fe[Fe(III)Fe(II)(CN)$_6$]$_3$, Fe$_4$[Fe (CN)$_6$]$_3$.nH$_2$O (where x is an integer of 1 or more)); ultramarine blue (Na$_p$Al$_6$Si$_6$O$_{24}$S$_q$ (where p is an integer ranging from 6 to 10, and q is an integer ranging from 2 to 4)), Fe(NH$_4$)Fe(CN)$_6$.xH$_2$O (where x is an integer of 1 or more); (Co(SCN)$_4$)$^{-2}$; and a combination thereof.

The green phosphor may include any green phosphor for a plasma display. The green phosphor is selected from the group consisting of $YAl_3(BO)_4$:Tb, $YBO_3$:Tb, (Ba, Sr, Mg)O.a$Al_2O_3$:Mn (where a ranges from 1 to 23), $Y_2SiO_5$:Tb, $Gd_2O_2S$:Tb, ZnS:(Cu, Al), $ZnSiO_4$:Mn, Zn(Ga, Al)$_2$O$_4$:Mn, $GdAl_3(BO_3)_4$:Tb, (Y,Gd)$BO_3$:Tb, $GdBO_3$:Tb, and a combination thereof, and in particular, the group consisting of $YAl_3$ $(BO)_4$:Tb, $YBO_3$:Tb, and a combination thereof, but is not limited thereto.

However, the $YAl_3$ $(BO)_4$:Tb has excellent luminance, discharge, and life-span characteristics among the green phosphors. In addition, it has reduced decay time of about 6 ms or less. In addition, when the $YAl_3(BO)_4$:Tb is used with the inorganic pigment, it can further improve color purity.

The green phosphor layer may include the inorganic pigment and the green phosphor in a weight ratio ranging from about 0.5:99.5 to about 10:90. In another embodiment, it may include them in a weight ratio ranging from 1:99 to 5:95. Herein, when the inorganic pigment is included in a smaller amount, it may deteriorate color purity. When it is included in a larger amount, it may deteriorate luminance characteristic.

The inorganic pigment can be simply mixed with the green phosphor to prepare a green phosphor, or it can be coated on the surface thereof. When the green phosphor is coated with an inorganic pigment on the surface, it can further absorb a wavelength ranging from about 580 nm to about 640 nm.

The green phosphor has a particle diameter ranging from about 2 μm to about 5 μm, and in another embodiment it has a particle diameter ranging from about 2.5 μm to about 3 μm. The inorganic pigment has a particle diameter ranging from about 0.002 μm to 1.5 μm, and in another embodiment it has a particle diameter ranging from about 0.01 μm to about 0.8 μm, while in a still further embodiment, it has a particle diameter ranging from about 0.05 μm to 0.2 μm. When the inorganic pigment has a smaller particle diameter, the green phosphor may have little effect on increasing color purity. When it has a larger particle diameter, it may deteriorate light-emission of a phosphor on the surface, generally decreasing efficiency.

The green phosphor and the inorganic pigment may have a particle diameter ratio ranging from 1:about 0.1 to about 0.8. In another embodiment, they have a particle diameter ratio ranging from 1:about 0.3 to about 0.4. When they have a particle diameter ratio within the range, they can accomplish excellent luminous efficiency and color purity.

Hereinafter, an embodiment of the present invention will be described in detail with reference to the accompanying drawings. However, the present invention can be realized in various different ways, and is not limited to the illustrated embodiments.

FIG. 1 is a partially-exploded perspective view showing the structure of a PDP 100 according to one embodiment. Referring to FIG. 1, the PDP includes a first substrate 3, a plurality of address electrodes 13 disposed in one direction (a Y direction in the drawing) on the first substrate 3, and a dielectric layer 15 disposed on the surface of the first substrate 3 covering the address electrodes 13. Barrier ribs 5 are formed on the dielectric layer 15, and red (R), green (G), and blue (B) phosphor layers 8R, 8G, and 8B are disposed in discharge cells 7R, 7G, and 7B formed between the barrier ribs 5. The green phosphor layer 8G includes the green phosphor and an inorganic pigment absorbing a wavelength ranging from about 580 nm to about 640 nm.

The barrier ribs 5 may be formed in any shape, as long as their shape can partition the discharge space. In addition, the barrier ribs 5 can have diverse patterns. For example, the barrier ribs 5 may be formed as an open type such as stripes, or as a closed type such as a waffle, a matrix, or a delta shape. The closed-type barrier ribs may form a discharge space with a horizontal cross-section of a polygon such as a quadrangle, a triangle, or a pentagon, or of a circle or an oval.

Next, display electrodes 9 and 11, each including a pair of a transparent electrode (9a, 11a) and a bus electrode (9b, 11b), are disposed in a direction crossing the address electrodes 13 (an X direction in the drawing) on one surface of a second substrate 1 facing the first substrate 3. Also, a dielectric layer 17 and a MgO protective layer 19 are disposed on the surface of the second substrate 1 while covering the display electrodes 9 and 11.

Discharge cells are formed at positions where the address electrodes 13 of the first substrate 3 are crossed by the display electrodes 9 and 11 of the second substrate 1.

The PDP is operated by performing address discharge by applying an address voltage (Va) to a space between the address electrodes 13 and the display electrodes 9 and 11 and a sustain voltage (Vs) to a space between a pair of display electrodes 9 and 11. Herein, an excitation source is generated from a sustain discharge and excites corresponding phosphors to thereby emit visible light through the second substrate 1 and display an image. The phosphors are usually excited by vacuum ultraviolet (VUV) rays.

The following examples illustrate the present invention in more detail. However, it is understood that the present invention is not limited by these examples.

FABRICATION OF PDP

Example 1

A green phosphor paste was prepared by mixing 6 parts by weight of ethylcellulose as a binder with 100 parts by weight of a solvent prepared by mixing butylcarbitolacetate and terpineol in a weight ratio of 3:7, and then adding 40 parts by weight of a mixed powder prepared by mixing a $YAl_3(BO)_4$:Tb green phosphor powder and a $(Co(SCN)_4)^{-2}$ inorganic pigment in a weight ratio of 99:1 thereto. Herein, the green phosphor had a particle diameter of 2 μm, and the inorganic pigment had a particle diameter of 0.25 μm.

The green phosphor paste was coated inside of the discharge cell in barrier ribs of a first substrate. Then, the first substrate was dried and fired to prepare a green phosphor layer.

In addition, red (($Y,Gd)BO_3$:Eu, $Y(P,V)O_4$:Eu) and blue ($BaMgAl_{10}O_{17}$:Eu) phosphor layers were prepared inside red and blue discharge cells according to the same method as the green phosphor layer.

The first substrate having the red, green, and blue phosphor layers was assembled with a second substrate having a display electrode. The assembly was sealed, discharged, implanted, and aged, fabricating a PDP.

Example 2

A PDP was fabricated according to the same method as in Example 1, except for adding a powder of the $YAl_3(BO)_4$:Tb green phosphor powder and the $(Co(SCN)_4)^{-2}$ inorganic pigment mixed in a weight ratio of 95:5.

Example 3

A PDP was fabricated according to the same method as in Example 1, except for adding a powder of the $YAl_3(BO)_4$:Tb green phosphor powder and the $(Co(SCN)_4)^{-2}$ inorganic pigment mixed in a weight ratio of 90:10.

Example 4

A PDP was fabricated according to the same method as in Example 1, except for using an ultramarine blue inorganic pigment instead of the $(Co(SCN)_4)^{-2}$ inorganic pigment.

Example 5

A PDP was fabricated according to the same method as in Example 4, except for adding a powder of the $YAl_3(BO)_4$:Tb green phosphor powder and the ultramarine blue inorganic pigment mixed in a weight ratio of 95:5.

Example 6

A PDP was fabricated according to the same method as in Example 4, except for adding a powder of the $YAl_3(BO)_4$:Tb green phosphor powder and the ultramarine blue inorganic pigment mixed in a weight ratio of 90:10.

Example 7

A PDP was fabricated according to the same method as in Example 1, except that the green phosphor had a particle diameter of 3 μm, and the inorganic pigment had a particle diameter of 0.25 μm.

Example 8

A PDP was fabricated according to the same method as in Example 1, except that the green phosphor had a particle diameter of 5 μm, and the inorganic pigment had a particle diameter of 0.25 μm.

Example 9

A PDP was fabricated according to the same method as in Example 1, except that the green phosphor had a particle diameter of 2 μm, and the inorganic pigment had a particle diameter of 0.5 μm.

Example 10

A PDP was fabricated according to the same method as in Example 1, except that the green phosphor had a particle diameter of 2 μm, and the inorganic pigment had a particle diameter of 1 μm.

Comparative Example 1

A PDP was fabricated according to the same method as in Example 1, except that the $(Co(SCN)_4)^{-2}$ inorganic pigment was not used.

Color Purity Measurement of Green Phosphor Layers

The green phosphors of the PDPs of Example 2 and Comparative Example 1 were measured regarding module spectrum with no outdoor light by using a CS-1000 (Konica Minolta). The results are provided in FIG. 2.

Figure 2:
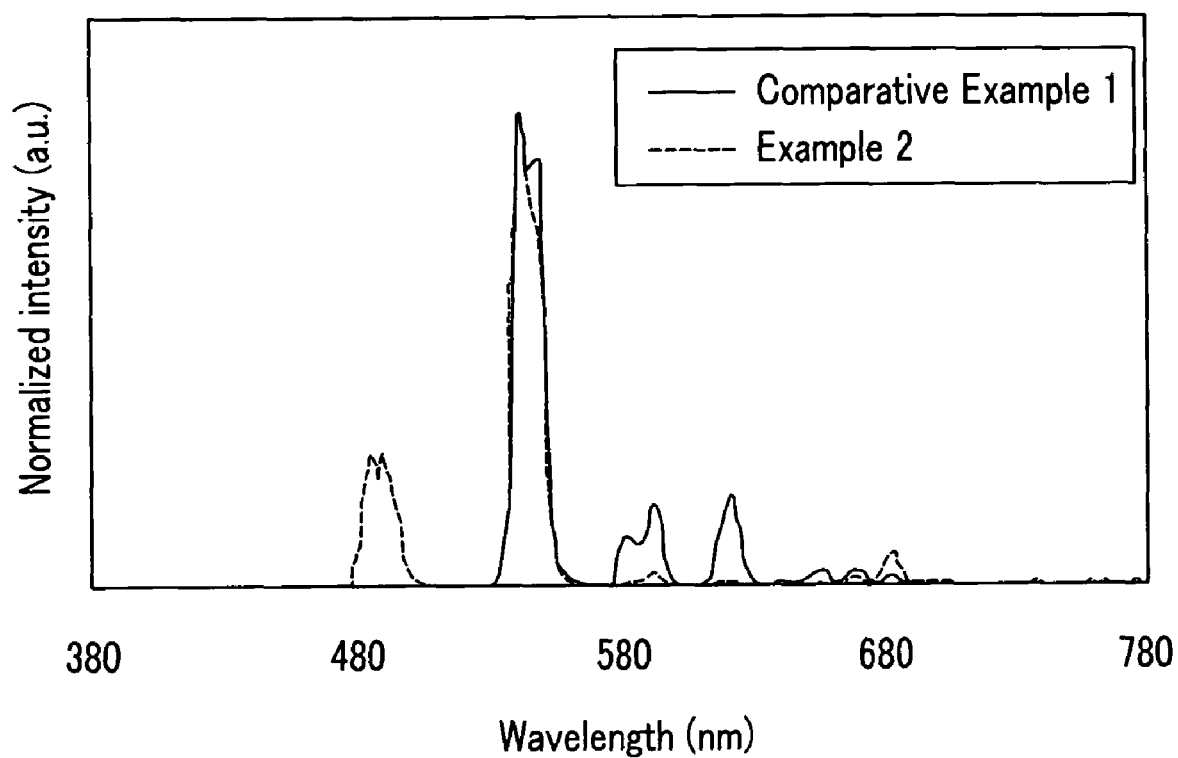
FIG. 2 is a graph showing module spectra of the green phosphors of plasma display panels (PDP) according to Example 2 and Comparative Example 1.

As shown in FIG. 2, the green phosphor layer of the PDP according to Example 2 turned out to absorb a wavelength ranging from about 580 nm to about 640 nm due to the inorganic pigment absorbing a wavelength ranging from about 580 nm to about 640 nm. However, it was confirmed that the phosphor layer according to Comparative Example 1 did not absorb a wavelength within the above range.

The green phosphors according to Examples 1, 2, 7, 8, 9 and 10 and Comparative Example 1 were measured regarding color reproduction range with no outdoor light by using a CS-1000 (Konica Minolta). The results are provided in the following Table 1, 2 and FIG. 3.

TABLE 1

| Weight ratio | Green phosphor (wt %) | Pigment (wt %) | Color reproduction area (area %) |
|---|---|---|---|
| Comparative Example 1 | 100 | 0 | 66.7 |
| Example 1 | 99 | 1 | 70.1 |
| Example 2 | 95 | 5 | 81.6 |

As shown in Table 1, the green phosphor layers of the PDPs of Examples 1 and 2 included an inorganic pigment absorbing a wavelength ranging from about 580 nm to about 640 nm and respectively showed a color reproduction area increase of up to 70.1% and 81.6%, while the green phosphor layer of the PDP of Comparative Example 1 did not include an inorganic pigment and maintained 66.7% of a color reproduction area based on NTSC (National Television System Committee) coordinates.

Figure 3:
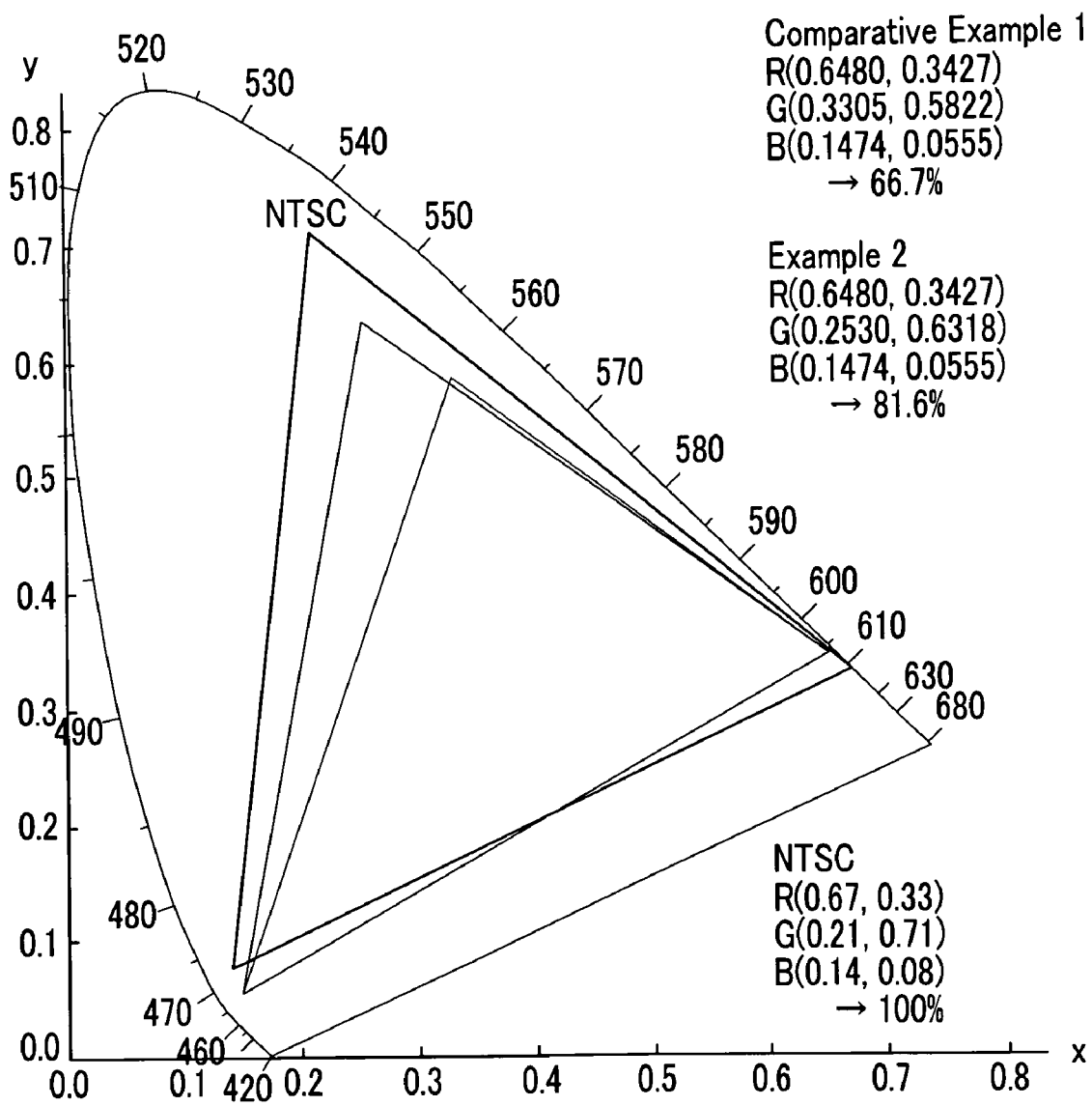
FIG. 3 is a graph showing color reproduction ranges of the green phosphors of plasma display panels (PDP) according to Example 2 and Comparative Example 1.

In addition, as shown in FIG. 3, the PDP of Example 2 had a color reproduction area of 81.6%, considering 100% of a color reproduction area according to the NTSC (National Television System Committee).

TABLE 2

| Particle diameter | Green phosphor (μm) | Pigment (μm) | Color reproduction area (area %) |
|---|---|---|---|
| Example 1 | 2 | 0.25 | 70.1 |
| Example 7 | 3 | 0.25 | 69.2 |
| Example 8 | 5 | 0.25 | 68.4 |
| Example 9 | 2 | 0.5 | 73.5 |
| Example 10 | 2 | 1 | 76.0 |

As shown in Table 2, the green phosphor layers of the PDPs of Examples 1, 7, 8, 9, and 10 included an inorganic pigment absorbing a wavelength ranging from 580 to 640 nm, and respectively showed a color reproduction area increase of up to 76.0% based on NTSC (National Television System Committee) coordinates.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A plasma display panel comprising:
    a first substrate and a second substrate facing each other;
    a plurality of address electrodes disposed on the first substrate;
    a plurality of display electrodes disposed on one side of the second substrate facing the first substrate in a direction crossing the address electrodes; and
    red, green, and blue phosphor layers disposed in a discharge space between the first substrate and the second substrate,
    wherein the green phosphor layer comprises a green phosphor and an inorganic pigment absorbing a wavelength of about 580 nm to 640 nm,
    wherein the green phosphor and the inorganic pigment have a particle diameter ratio ranging from 1:about 0.1 to about 0.8.

2. The plasma display panel of claim 1, wherein the inorganic pigment absorbs a wavelength of about 585 nm to about 595 nm and about 615 nm to about 625 nm.

3. The plasma display panel of claim 1, wherein the inorganic pigment is selected from the group consisting of: blue $(Fe[Fe(III)Fe(II) (CN)_6]_3$, $Fe_4\text{-}[Fe(CN)_6]_3.nH_2O$ (where n is an integer of 1 or more.)); ultramarine blue $(Na_pAl_6Si_6O_{24}S_q$ (where p is an integer ranging from 6 to 10, and q is an integer ranging from 2 to 4)); $Fe(NH_4)Fe(CN)_6.xH_2O$ (where x is an integer of 1 or more); phthalocyanine blue; cobalt blue $(CoO.Al_2O_3)$; vanadium blue; $2(Co,Zn)O.SiO_2$; $ZrSiO_4$; cerulean blue $(CoO.nSiO_2.MgO$ (where n is an integer of 1 or more.)); Prussian blue $(KFe[Fe(CN)_6])$; $(Co(SCN)_4)^{-2}$; and a combination thereof.

4. The plasma display panel of claim 1, wherein the green phosphor is selected from the group consisting of: $YAl_3(BO_4)_4$:Tb; $YBO_3$:Tb; (Ba, Sr, Mg)O.a$Al_2O_3$:Mn (where a ranges from 1 to 23); $Y_2SiO_5$:Tb; $Gd_2O_2S$:Tb; ZnS:(Cu, Al); $ZnSiO_4$:Mn; Zn(Ga, Al)$_2O_4$:Mn; $GdAl_3(BO_3)_4$:Tb; (Y,Gd)$BO_3$:Tb, $GdBO_3$:Tb; and a combination thereof.

5. The plasma display panel of claim 1, wherein the green phosphor is $YAl_3 (BO_4)_4$:Tb.

6. The plasma display panel of claim 1, wherein the green phosphor layer comprises the inorganic pigment and the green phosphor in a weight ratio ranging from about 0.5:99.5 to about 10:90.

7. The plasma display panel of claim 1, wherein the green phosphor layer comprises the inorganic pigment and the green phosphor in a weight ratio ranging from about 1:99 to 5:95.

8. The plasma display panel of claim 1, wherein the inorganic pigment is mixed with the green phosphor or coated on the surface thereof.

9. The plasma display panel of claim 1, wherein the green phosphor has a particle diameter ranging from about 2 μm to about 5 μm, and the inorganic pigment has a particle diameter ranging from about 0.002 μm to 1.5 μm.

10. A plasma display panel comprising:
a first substrate and a second substrate facing each other;
a plurality of address electrodes disposed on the first substrate;
a plurality of display electrodes disposed on the second substrate; and
red, green, and blue phosphor layers disposed in a discharge space between the first substrate and the second substrate,
wherein the green phosphor layer comprises:
a green phosphor having a particle diameter ranging from about 2 μm to about 5 μm; and
an inorganic pigment having a particle diameter ranging from about 0.002 μm to about 1.5 μm.

11. The plasma display panel of claim 10, wherein the inorganic pigment absorbs a wavelength of about 585 nm to about 595 nm and about 615 nm to about 625 nm.

12. The plasma display panel of claim 10, wherein the green phosphor layer comprises the inorganic pigment and the green phosphor in a weight ratio ranging from about 0.5:99.5 to about 10:90.

13. The plasma display panel of claim 10, wherein the green phosphor layer comprises the inorganic pigment and the green phosphor in a weight ratio ranging from about 1:99 to about 5:95.

14. The plasma display panel of claim 10, wherein the inorganic pigment is mixed with the green phosphor or coated on the surface thereof.

15. The plasma display panel of claim 10, wherein the green phosphor and the inorganic pigment have a particle diameter ratio ranging from 1:about 0.1 to about 0.8.

16. The plasma display panel of claim 10, wherein the green phosphor and the inorganic pigment absorb light at a wavelength of about 580 nm to about 640 nm.

17. A plasma display panel comprising:
a first substrate and a second substrate facing each other;
a plurality of address electrodes disposed on the first substrate;
a plurality of display electrodes disposed on the second substrate; and
red, green, and blue phosphor layers disposed in a discharge space between the first substrate and the second substrate,
wherein the green phosphor layer comprises:
a green phosphor; and
an inorganic pigment,
wherein a weight ratio of the inorganic pigment over the green phosphor is in a range from about 0.5:99.5 to about 10:90,
wherein the green phosphor and the inorganic pigment have a particle diameter ratio ranging from 1:about 0.1 to about 0.8.

18. The plasma display panel of claim 17, wherein the inorganic pigment absorbs a wavelength of about 585 nm to about 595 nm and about 615 nm to about 625 nm.

19. The plasma display panel of claim 17, wherein the green phosphor layer comprises the inorganic pigment and the green phosphor in a weight ratio ranging from 1:99 to about 5:95.

20. The plasma display panel of claim 17, wherein the inorganic pigment is mixed with the green phosphor or coated on the surface thereof.

21. The plasma display panel of claim 17, wherein the green phosphor and the inorganic pigment absorb light at a wavelength of about 580 nm to 640 nm.

22. The plasma display panel of claim 17, wherein the green phosphor has a particle diameter ranging from about 2 μm to about 5 μm, and the inorganic pigment has a particle diameter ranging from about 0.002 μm to 1.5 μm.

* * * * *